United States Patent
Dong et al.

(10) Patent No.: US 9,037,941 B2
(45) Date of Patent: May 19, 2015

(54) SYSTEMS AND METHODS FOR ERROR CHECKING AND CORRECTING FOR MEMORY MODULE

(71) Applicant: VIA TECHNOLOGIES, INC., New Taipei (TW)

(72) Inventors: Yiming Dong, Beijing (CN); Ji Zhong, Beijing (CN); Li Shen, Beijing (CN); Wei Wang, Beijing (CN)

(73) Assignee: VIA TECHNOLOGIES, INC., New Taipei (TW)

( * ) Notice: Subject to any disclaimer, the term of this patent is extended or adjusted under 35 U.S.C. 154(b) by 155 days.

(21) Appl. No.: 13/677,785

(22) Filed: Nov. 15, 2012

(65) Prior Publication Data

US 2013/0179748 A1    Jul. 11, 2013

(30) Foreign Application Priority Data

Jan. 6, 2012 (CN) .......................... 2012 1 0003924

(51) Int. Cl.
*H03M 13/00* (2006.01)
*G11C 29/00* (2006.01)
*G06F 11/10* (2006.01)

(52) U.S. Cl.
CPC ................................. *G06F 11/1012* (2013.01)

(58) Field of Classification Search
None
See application file for complete search history.

(56) References Cited

U.S. PATENT DOCUMENTS

| | | | | |
|---|---|---|---|---|
| 7,227,797 B2 * | 6/2007 | Thayer et al. | ................. | 365/201 |
| 7,673,222 B2 * | 3/2010 | Chiou | ........................... | 714/774 |
| 8,627,175 B2 * | 1/2014 | Patapoutian et al. | ......... | 714/763 |
| 8,645,789 B2 * | 2/2014 | Sharon et al. | ................. | 714/755 |
| 2009/0282319 A1 * | 11/2009 | No et al. | ........................ | 714/780 |
| 2011/0197109 A1 * | 8/2011 | Kanno et al. | ................... | 714/773 |
| 2011/0320902 A1 * | 12/2011 | Gunnam | ...................... | 714/752 |
| 2013/0145230 A1 | 6/2013 | Kanno et al. | | |
| 2013/0166986 A1 * | 6/2013 | Alrod et al. | ................... | 714/755 |

FOREIGN PATENT DOCUMENTS

CN          101622603          1/2010

OTHER PUBLICATIONS

English language translation of abstract of CN 101622603 (published Jan. 6, 2010).

* cited by examiner

*Primary Examiner* — Justin R Knapp
(74) *Attorney, Agent, or Firm* — McClure, Qualey & Rodack, LLP (57) ABSTRACT

Methods for error checking and correcting (ECC) in a memory module including at least one memory unit are provided. The method includes the steps of: receiving input data from the memory unit; performing, by a first ECC module, a first ECC operation to the input data and generating a decoding result which indicates whether decoding was successful; and determining whether to activate a second ECC module to perform a second ECC operation to the input data according to the decoding result, wherein the first and second ECC modules respectively utilize a first method and a second method, wherein the first method applies a ECC with a first fault tolerant quantity for error correction and the second method applies a ECC with a second fault tolerant quantity for error correction, and the second fault tolerant quantity is larger than the first fault tolerant quantity.

18 Claims, 6 Drawing Sheets

FIG. 6

SYSTEMS AND METHODS FOR ERROR CHECKING AND CORRECTING FOR MEMORY MODULE

CROSS REFERENCE TO RELATED APPLICATIONS

This Application claims priority of China Application No. 201210003924.8, filed on Jan. 6, 2012, and the entirety of which is incorporated by reference herein.

BACKGROUND OF THE INVENTION

1. Field of the Invention

The disclosure relates generally to error checking and correcting (ECC) techniques, and, more particularly to methods and systems for error checking and correcting (ECC) in a memory module.

2. Description of the Related Art

Error checking and correcting (ECC) or error correction code checking is a data checking and error correcting technique applicable to memory modules, used for checking whether data transmitted to a memory module is correct, and can be used for correcting data error. When errors occur in data, error correction code checking can autonomously correct errors, or request systems to retransmit data. Thus, normal operation of a system can be ensured, and data errors will not cause a machine crashing. The transmitted data is usually encoded as an error correction code (data information, redundant information and parity data can also be included) at the transmitting end prior to transmission in advance. When data with an error correction code is received at the receiving end, by using an error correction code, correct data will be recovered even when random errors generated during the transmission process of the data. Identically, in data storage systems, the stored data is usually encoded as an error correction code prior to data being stored in advance. When random error is generated during the storing process of the data, by using an error correction code, correct data can be recovered. Common error correction codes are BCH (Bose, Ray-Chaudhuri, and Hocquenghem) codes and RS (Reed-Solomon) codes, for example. BCH codes are usually used for the data storage of flash memory, while RS codes are usually used for the data storage of optical disc.

Generally, to enhance overall performance, a system controller may be employed with multiple channel structures such as multiple flash memory chips to help with computing, wherein, each channel is equipped with an error correction module for performing autonomous error correction to its data which is transmitted. However, conventional error correction module only equipped with limited autonomous error correcting capability. For example, error correction code with data fault tolerant quantity of 6 bits can only be used for error correction of data bit less than or equal to 6 bits. When error bit quantity is greater than 6 bits, the error correction module is not only unable to correct error, but also increases data error occurring in the transmitted data. Therefore, to provide better error correction performance, each channel can be equipped with an error correction module of a higher data fault tolerance quantity for error correction. However, an error correction module of a higher data fault tolerance quantity usually occupies more space and is more costly, thereby not only increasing hardware costs and complexity, but also making it not suitable for considerable quantities of use.

BRIEF SUMMARY OF THE INVENTION

Methods and systems for error checking and correcting (ECC) in a memory module are provided.

In an embodiment, a method for error checking and correcting (ECC) in a memory module is provided, wherein the memory module includes at least one memory unit. The method comprises the steps of receiving input data from the at least one memory unit, performing, by a first ECC module, a first ECC operation to the input data and generating a decoding result which indicates whether a decoding process is successful, and determining whether to activate a second ECC module to perform a second ECC operation to the input data according to the decoding result, wherein the first and second ECC modules respectively utilize a first method and a second method and the first method applies an error correction code with a first fault tolerant quantity for error correction and the second method applies an error correction code with a second fault tolerant quantity for error correction, wherein the second fault tolerant quantity is larger than the first fault tolerant quantity.

Another embodiment of an error checking and correcting (ECC) system of a memory module is further provided, wherein the memory module comprises a plurality of memory units. The ECC system comprises a plurality of first ECC modules, a second ECC module and an arbitrator. The plurality of first ECC modules are respectively coupled to the corresponding memory units, wherein each of the plurality of first ECC modules corresponds to one of the memory units and is used for receiving input data from the responsive memory unit and performing a first ECC operation to the input data to generate a decoding result. The second ECC module performs a second ECC operation when being activated, wherein the first and second ECC modules respectively utilize an error correction code with a first fault tolerant quantity and an error correction code with a second fault tolerant quantity for error correction, wherein the second fault tolerant quantity is larger than the first fault tolerant quantity. The arbitrator is coupled between the first ECC module and the second ECC module, wherein the arbitrator determines whether to activate the second ECC module according to the decoding results generated by the plurality of first ECC modules, wherein the arbitrator further determines to activate the second ECC module to perform the second ECC operation to the input data when any of the decoding results indicate that the decoding is not successful.

Methods for error checking and correcting (ECC) system of a memory module may take the form of a program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
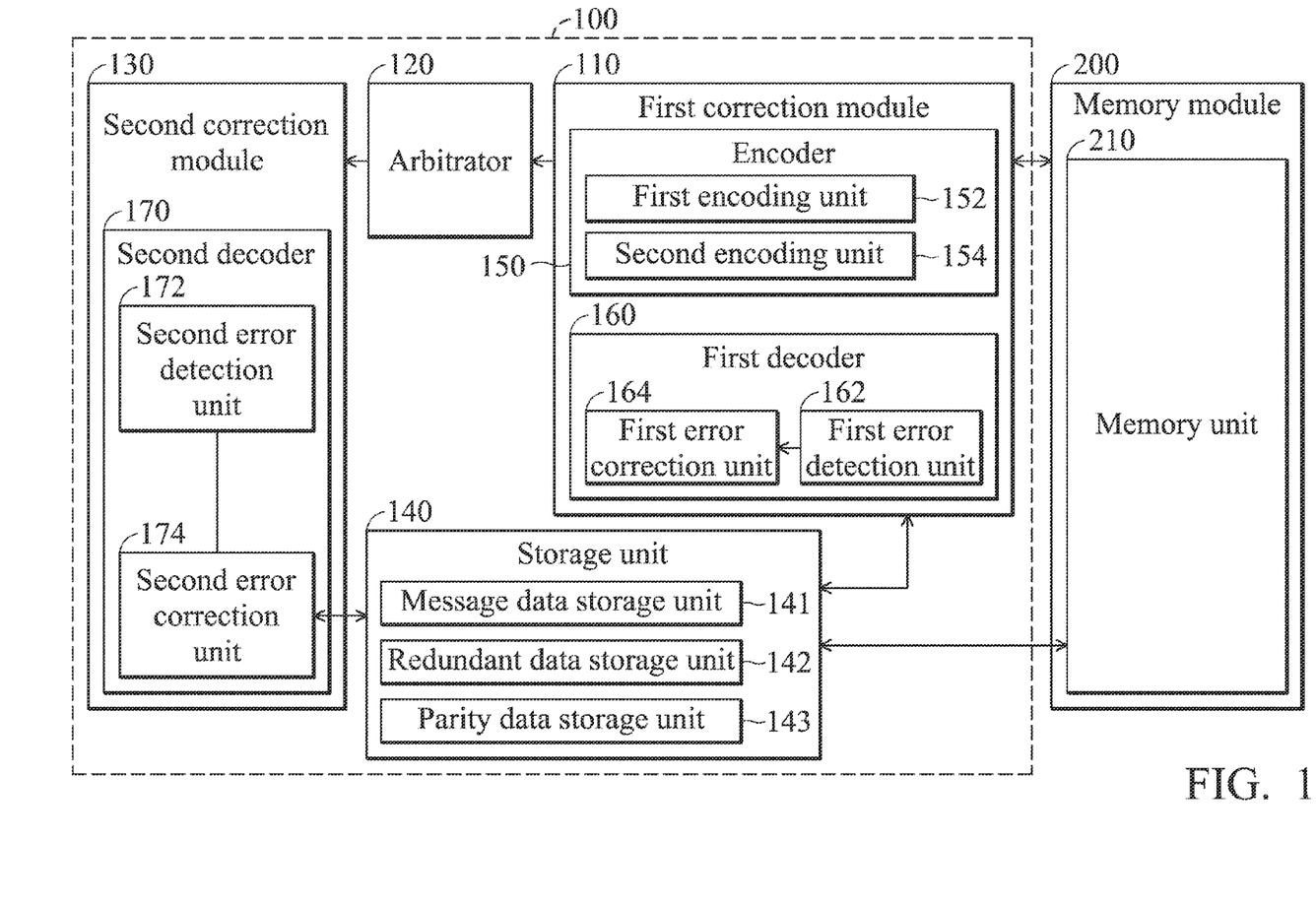
FIG. 1 is a schematic diagram illustrating an embodiment of an error checking and correcting (ECC) system of a memory module of the invention.

FIG. 1 is a schematic diagram illustrating an embodiment of an error checking and correcting (ECC) system of a memory module of the invention. As shown in FIG. 1, an ECC system 100 of a memory module is used for performing an ECC operation on a memory module 200, wherein the memory module 200 comprises one or more memory units 210. In one embodiment, each memory unit 210 may be an independent flash memory chip. It is to be noted that in the present invention, each memory unit 210 may also be referred to as a channel. In other words, in one embodiment, one flash memory chip is served as a unit of a channel and the memory module 200 is formed by a number of flash memory chips, but the invention is not limited thereto. The ECC system 100 of a memory module at least comprises a first error correction module 110, an arbitrator 120, a second error correction module 130 and a storage unit 140, wherein the first error correction module 110 is coupled to the memory unit 210 of the memory module 200 and is used for receiving/reading input data of the memory unit 210 and performing a first ECC operation to the input data to generate a decoding result. The first error correction module 110 utilizes a first method and the first method applies an error correction code with a first fault tolerant quantity for error correction. For example, the first error correction module 110 may utilize an error correction code with a fault tolerant quantity of 6-bits for error correction. That is, the first ECC operation may automatically check and correct errors with error bit lengths less than 6 bits. The decoding result is used for indicating whether a decoding process is successful or not, i.e. whether the first error correction module 110 can correct all of the errors automatically. When the first error correction module 110 utilizes the error correction code with the first fault tolerant quantity for performing the first ECC operation to the input data, if all errors can be automatically corrected (i.e. the error bit length is less than the first fault tolerant quantity), the decoding result indicates that decoding was successful, and if not all of the errors can be automatically corrected, the decoding result indicates that the decoding was not successful. The storage unit 140 is used for storing data required for the ECC operation, such as storing original message data, redundant data and parity data. It is to be understood that, the first error correction module 110 may only perform the error correction operation to the message data and redundant data stored in the first error correction module 110 when it is performing the first ECC operation.

Thereafter, the decoding result generated by the first error correction module 110 of the memory unit 210 will be sent to the arbitrator 120 for arbitration. The arbitrator 120 is coupled between the first error correction module 110 and the second error correction module 130, wherein the arbitrator 120 determines whether to activate/enable or deactivate/disable the second error correction module 130 according to the decoding result generated by the first error correction module 110. When the decoding result indicates that decoding was successful, which means that all errors have been automatically corrected, the arbitrator 120 determines to deactivate/disable the second error correction module 130. When the decoding result indicates that the decoding was not successful, which means that there still some errors can not be automatically corrected, the arbitrator 120 determines to activate/enable the second error correction module 130. The second error correction module 130 is used for performing a second ECC operation while it is being activated by the arbitrator 120. The second error correction module 130 utilizes a second method and the second method applies an error correction code with a second fault tolerant quantity for error correction, wherein the second fault tolerant quantity is more than the first fault tolerant quantity. For example, in one embodiment, the first error correction module 110 may utilize an error correction code with a fault tolerant quantity of 6-bits for error correction while the second error correction module 130 may utilize an error correction code with a fault tolerant quantity of 36-bits for error correction and, thus, the first ECC operation may automatically check and correct errors with error bit lengths less than 6 bits and the second ECC operation may automatically check and correct errors with error bit lengths less than 36 bits. Because there is a low probability for the occurrence of errors with error bit lengths exceeding 6 bits, the second error correction module 130 will not be activated so frequently. Thus, not only can the performance of the ECC operation be enhanced but also power consumed by the second error correction module 130 can be saved.

Moreover, the first error correction module 110 may further comprise an encoder 150 and a first decoder 160, wherein the encoder 150 is used for generating and encoding the error correction code and the first decoder 160 is used for performing the first ECC operation. The encoder 150 may further comprise a first encoding unit 152 and a second encoding unit 154, wherein the encoder 150 receives data to be written to the memory unit 210 during a data writing operation, and respectively applies a first encoding method and a second encoding method to the received data to generate first parity data corresponding the first method and second parity data corresponding to the second method according to the received data, generates an encoded data according to the received data, and the first and second parity data, and then writes the encoded data to the memory unit 210. For example, the first encoding unit 152 may generate a parity data corresponding to the error correction code with a fault tolerant quantity of 6 bits while the second encoding unit 154 may generate a parity data corresponding to the error correction code with a fault tolerant quantity of 36 bits. The encoder 150 and operation thereof will be discussed further in the following paragraphs with reference to FIG. 5.

The first decoder 160 may further include a first error detection unit 162 and a first error correction unit 164. The first error detection unit 162 may perform a first error detection operation to the input data and generate a detection result during a data reading operation, wherein the detection result indicates whether the input data has errors. The first error correction unit 164 is coupled to the first error detection unit 162 for performing the first ECC operation to the input data to generate a responsive decoding result to the arbitrator 120 when the detection result indicates that the input data has errors. The first decoder 160 and operation thereof will be discussed further in the following paragraphs with reference to FIG. 6.

Similarly, the second ECC module 130 is coupled to the arbitrator 120 and is activated upon reception of an activation signal from the arbitrator 120. When being activated, the second error correction module 130 performs the second ECC operation. The activation signal is generated by the arbitrator 120 for activating the second error correction module 130 to perform the second ECC operation when detecting that the decoding result generated by the first error correction module 110 indicates that the decoding was not successful. The second error correction module 130 may further comprise a second decoder 170, which may further include a second error detection unit 172 and a second error correction unit 174. The second error detection unit 172 may perform a second error detection operation to the input data and generate a detection result during a data reading operation, wherein the detection result indicates whether the input data has errors. The second error correction unit 174 is coupled to the second error detection unit 172 for performing the second ECC operation to correct errors of the input data. For example, the second error correction module 130 may utilize an error correction code with a fault tolerant quantity of 36-bits for error correction and thus the second error correction unit 174 may apply this error correction code with a fault tolerant quantity of 36-bits for error correction to perform the second ECC operation so as to automatically check and correct errors with error bit lengths less than 36 bits. The second error correction module 130 is activated only when the decoding of the first error correction module 110 is not successful, which indicates that the first error correction module 110 has already detected that the input data has errors. So, in another embodiment, the second error correction module 130 may omit the second error detection unit 172 and directly perform the error correction operation by the second error correction unit 174 when the decoding result generated by the first error correction module 110 indicates that the decoding was not successful. The second error correction unit 174 may correct original input data or corrected data which was already corrected by the first error correction unit 164.

The storage unit 140 is coupled to the first error correction module 110, the second error correction module 130 and the memory module 200, wherein the storage unit 140 receives and stores the input data read from the memory unit 210 for reading by the first ECC module 110 and the second ECC module 130 to perform the error correction operation. The storage unit 140 may further receive and store a corrected data output by the first ECC module 110 when its decoding is successful or corrected data outputted by the second ECC module 130 when the decoding of the first ECC module 110 is not successful for reading by a host (not shown). In one embodiment, the storage unit 140 further includes a message data storage unit 141, a redundant data storage unit 142 and a parity data storage unit 143 for storing the message data, the redundant data and the parity data respectively. The parity data stored in the parity data storage unit 143 may further comprise first parity data corresponding to the first method and second parity data corresponding to the second method. In one embodiment, the storage unit 140 can be implemented as a static random access memory (SRAM).

Figure 2:
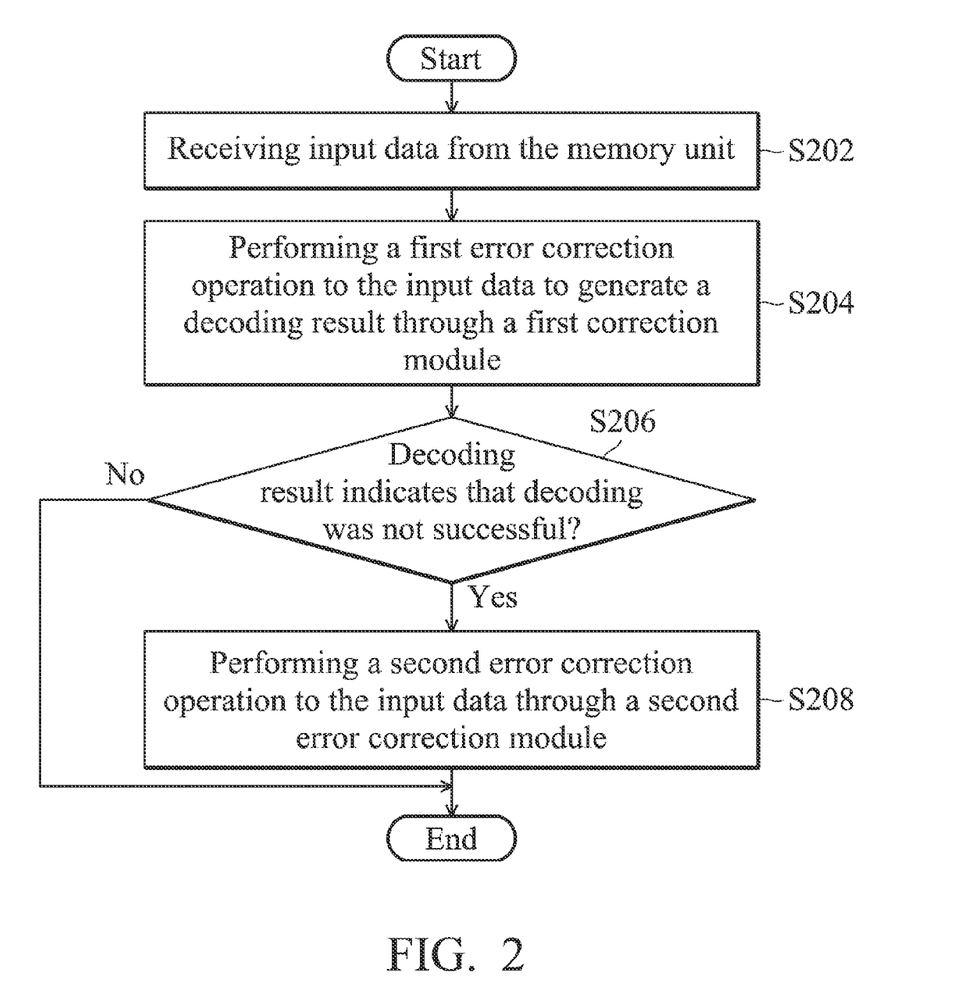
FIG. 2 is a flowchart of an embodiment of a method for error checking and correcting (ECC) in a memory module including at least one memory unit the invention.

FIG. 2 is a flowchart of an embodiment of a method for error checking and correcting (ECC) in a memory module of the invention. The method for error checking and correcting (ECC) in a memory module of the invention can be applied to the ECC system 100 of the memory module shown in FIG. 1 for automatically performing an ECC operation. In this embodiment, the memory module 200 comprises at least one memory unit 210 and the memory unit 210 is a flash memory chip.

First, in step S202, the first error correction module 110 receives input data from the memory unit 210 through the first decoder 160. Then, in step S204, the first error correction module 110 performs a first ECC operation to the input data to generate a decoding result, wherein the decoding result is used for indicating whether a decoding process was successful or not. To be more specific, the first decoder 160 performs an error detection operation to the input data through a first error detection unit 162 to generate a detection result, wherein the detection result indicates whether the input data has errors. If not, the method ends. If so, the first decoder 160 performs a first ECC operation. For example, the first decoder 160 may utilize an error correction code with a first fault tolerant quantity, such as a fault tolerant quantity of 6-bits, for error correction. When the first error correction module 110 utilizes the error correction code with the first fault tolerant quantity for performing the first ECC operation to the input data, if all errors can be automatically corrected, the decoding result indicates that decoding was successful, and if not all of the errors can be automatically corrected, the decoding result indicates that the decoding was not successful.

Thereafter, in step S206, the arbitrator 120 determines whether to perform a second ECC operation to the input data through the second error correction module 130 according to the decoding result generated by the first error correction module 110. Note that the second error correction module 130 utilizes an error correction code with a second fault tolerant quantity for error correction, wherein the second fault tolerant quantity is larger than the first fault tolerant quantity utilized by the first error correction module 110. For example, the first fault tolerant quantity is set to be 6-bits while the second fault tolerant quantity is set to be 36/60 bits. When the decoding result indicates that decoding was successful (No in step S206), which means that all the errors have been automatically corrected by the first error correction module 110 and the activation of the second error correction module 130 in level 2 is not necessary, the arbitrator 120 determines to deactivate/disable the second error correction module 130. In other words, the arbitrator 120 does not perform the second ECC operation through the second error correction module 130 when the decoding result indicates that decoding was successful. Contrarily, when the decoding result indicates that the decoding was not successful (Yes in step S206), which means that there are still some errors which can not be automatically corrected by the first error correction module 110, the arbitrator 120 determines to activate/enable the second error correction module 130 to perform the second ECC operation to the input data through the second error correction module 130 (step S208).

As there are almost 90% for the probability of the occurrence of errors with few bits among all possible error occurrence situations, the first ECC operation performed in the first level error correction of the invention may spend less time for error correction to deal with most errors. Even if the situation that errors with large error bit lengths has occurred, the second ECC operation performed in the second level error correction of the invention may further be utilized to correct all errors, thus ensuring the data accuracy.

In some embodiments, when all of the decoding results of a number of memory units 210 in the memory module 200 indicate that the decoding is not successful, the arbitrator 120 may further determine an execution sequence of the second ECC operation for the memory units 210 which are not decoded successfully. It is assumed that a plurality of memory units 210 are not decoded successfully at the same time, and the arbitrator 120 may service those memory units 210 which are not decoded successfully by a predetermined arbitration rule such as Round-Robin arbitration. For example, the execution sequence of the arbitrator 120 may be determined by polling from the memory unit 0 to memory unit 7 in order (e.g. by the Round-Robin arbitration). In other embodiments, each of the memory units may have a priority, wherein the memory unit which has the highest priority will be first executed. The priority of the memory unit which has been already served will become the lowest one and the priority of the next memory unit will become the highest one for a next service. For example, if both the memory unit 0 and the memory unit 1 require to activate the level 2 error correction, as the polling sequence is first to poll the memory unit 0, and then to poll the memory unit 1, the memory unit 0 will first execute the level 2 error correction and the priority of the memory unit 0 is set to be the lowest one while the priority of the memory unit 1 is set to be the highest one. Thus, the memory unit 1 will sequentially perform the level 2 error correction.

Figure 3:
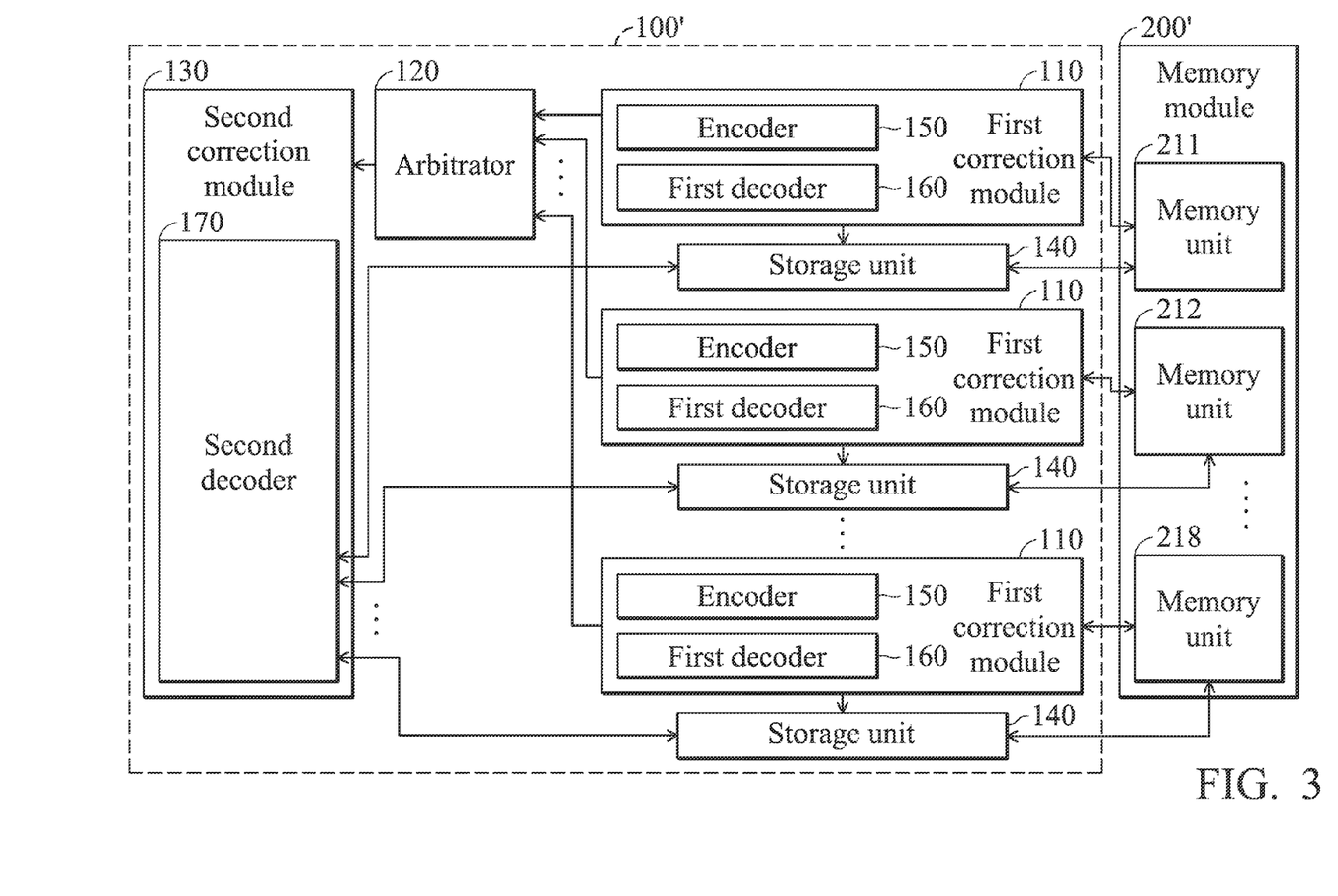
FIG. 3 is a schematic diagram illustrating another embodiment of an error checking and correcting (ECC) system of a memory module of the invention.

FIG. 3 is a schematic diagram illustrating another embodiment of an error checking and correcting (ECC) system of a memory module of the invention. As shown in FIG. 3, the ECC system 100' of a memory module is used for performing error checking and correcting to the memory module 200', wherein the memory module 200' comprises a plurality of memory units 211-218.

In this embodiment, each of the memory units 211-218 may be a flash memory chip and thus the memory module 200' is formed by a plurality of flash memory chips. The ECC system 100' of a memory module at least comprises a plurality of first error correction modules 110, an arbitrator 120 and a second error correction module 130, wherein each of the first error correction modules 110 is coupled to a corresponding one of the memory units 211-218 and is used for receiving/reading input data of the responsive memory unit and performing a first ECC operation to the input data to generate a decoding result. The first error correction module 110 utilizes an error correction code with a first fault tolerant quantity, such as a fault tolerant quantity of 6-bits, for error correction. Similarly, when the first error correction module 110 utilizes the error correction code with the first fault tolerant quantity for performing the first ECC operation to the input data, if all errors can be automatically corrected (i.e. the error bit length is less than the first fault tolerant quantity), the decoding result indicates that decoding was successful, and if not all of the errors can be automatically corrected, the decoding result indicates that the decoding was not successful.

All of the decoding results, each decoding result of which is generated by each of the first error correction module 110 corresponding to the memory units 211-218, will be sent to the arbitrator 120 for arbitration. The arbitrator 120 is coupled between all of the first error correction modules 110 and the second error correction module 130, wherein the arbitrator 120 determines whether to activate/enable or deactivate/disable the second error correction module 130 according to all of the decoding results generated by the first error correction modules 110. When all of the decoding results indicate that the all of decoding are successful, which means that all the errors have been automatically corrected and the activation of the second error correction module 130 in level 2 error correction is not necessary, the arbitrator 120 determines to deactivate/disable the second error correction module 130. Contrarily, when any of the decoding results indicates that the decoding is not successful, which means that there are still some errors which can not be automatically corrected, the arbitrator 120 determines to activate/enable the second error correction module 130. For example, if eight first error correction modules 110 corresponding to each of eight memory units (e.g., memory unit 211-218) are coupled to the arbitrator 120, the level 2 error correction is activated/enabled if the decoding result of the first ECC operation for any of the eight memory units indicates that the decoding was not successful. The second error correction module 130 is used for performing a second ECC operation while it is being activated by the arbitrator 120. The second error correction module 130 utilizes an error correction code with a second fault tolerant quantity for error correction, wherein the second fault tolerant quantity is larger than the first fault tolerant quantity. For example, in one embodiment, the first error correction module 110 may utilize an error correction code with a fault tolerant quantity of 6-bits for error correction and, thus, the first ECC operation may automatically check and correct at most 6-bit errors occurring in 1024 bytes while the second error correction module 130 may utilize an error correction code with a fault tolerant quantity of 36/60-bits for error correction and, thus, the second ECC operation may automatically check and correct at most 36-bit/60-bit errors occurring in 1024 bytes.

For example, in one embodiment, when both of the decoding results of a first memory unit (e.g. the memory unit 211) and a second memory unit (e.g. the memory unit 212) indicate that the decoding is not successful, the arbitrator 120 may apply a polling method to poll the first and second memory units by a predetermined polling sequence to sequentially perform the second ECC operation for the first and second memory units using the second error correction module 130. In another embodiment, each of the first and second memory units may have a priority, and the second ECC operation is sequentially performed to the first and second memory units according to their priorities. The arbitrator 120 may utilize the second error correction module 130 to perform the second ECC operation to all of the memory units sequentially based on corresponding priority of each memory unit in a descending order.

In some embodiments, as only the input data has errors with fewer error bits (e.g. less than 4 bits) would be occurred in normal case, the second level (level 2) error correction will be activated/enabled occasionally and thus a dedicated register may be further configured to select by the user for selecting that whether only the first level error correction is allowed to be activated while the second level error correction is not allowed to be activated for power saving or whether both the first and second levels error corrections are allowed to be activated as shown in above-mentioned embodiments based on actual requirement. In some embodiments, one or more third error correction units with different error correction capabilities may further be provided and thus dedicated registers may be further configured to select by the user for selecting from one of the following based on actual requirement for enhancing the overall error correction capability: only the first level error correction is allowed to be activated, or only the second or third error correction unit in the second level error correction is allowed to be activated, or both the first and second levels error corrections are allowed to be activated.

Figure 4:
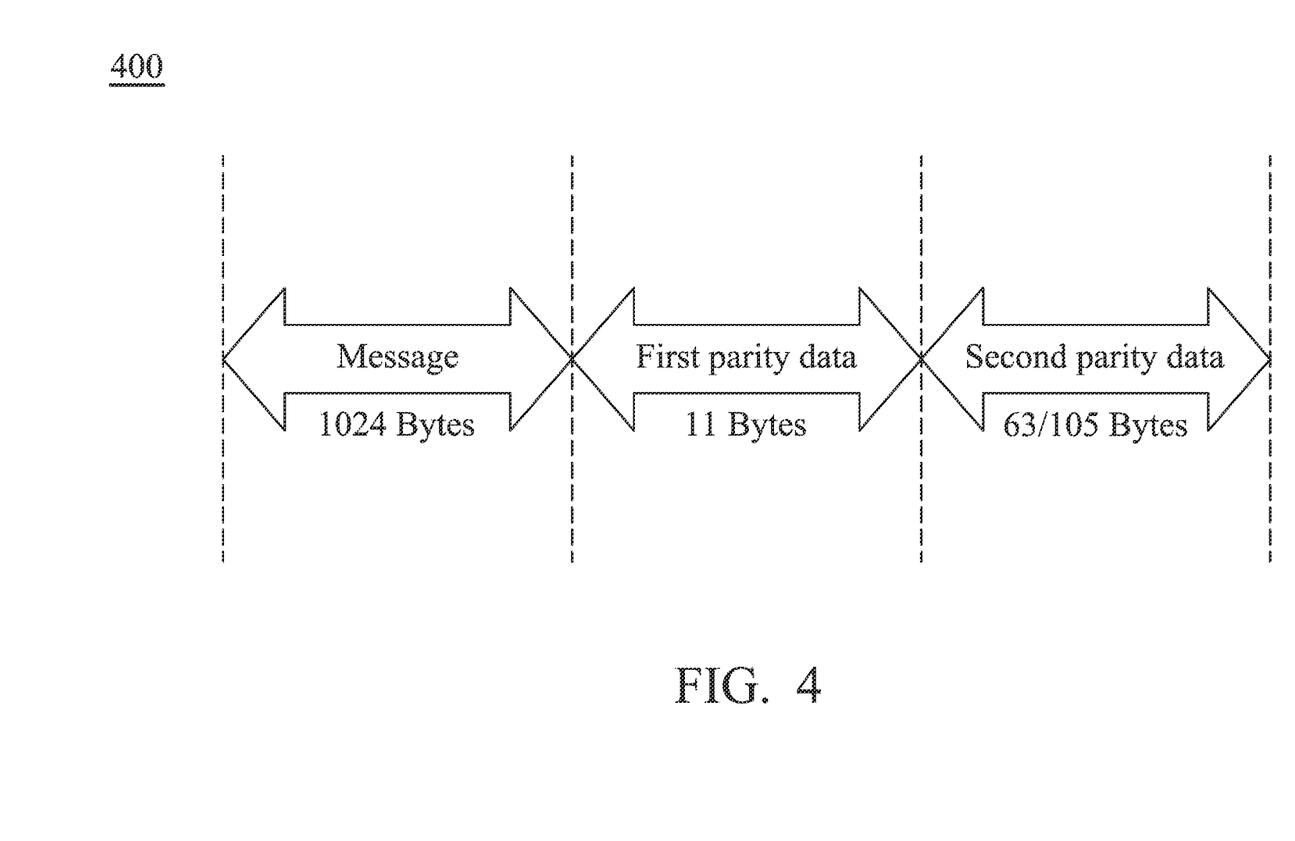
FIG. 4 is a schematic diagram illustrating an embodiment of an encoded data of the invention.

Now refer back to FIG. 1, as two levels of error correction may possibly be utilized at the same time in the present invention, the encoder 150 of the first error correction module 110 has to generate two parity data corresponding to the two level error corrections respectively at the same time during the data writing operation. The encoder 150 may receive data to be written to the memory module 200 during the data writing operation, respectively utilize the first and second encoding units 152 and 154 to generate first parity data and second parity data according to the data to be written, generate an encoded data according to the data to be written, the first and second parity data, and then writes the encoded data to responsive memory unit. For example, data to be written from the host (not shown) to the memory module 200 may be first temporally stored in a dynamic random access memory (DRAM) (not shown), and then the message data of 1024 bytes and the parity data are read from the DRAM and respectively stored in a data area and a spare area of the memory unit, such as the NAND-type flash memory, for use in subsequent data reading operation. FIG. 4 is a schematic diagram illustrating an embodiment of an encoded data of the invention. As shown in FIG. 4, the encoded data 400 at least includes three portions, i.e., original message data, first parity data and second parity data, wherein the data lengths of the first and second parity data depend on fault tolerant quantity utilized in their error correction codes. In some embodiments, the original message data may further include redundant information corresponding to the error correction. In one embodiment, a Bose-Chaudhuri-Hocaquenham (BCH) code is applied to the error correction operation as an example of the encoding method of the error correction code, and the length of the error correction code may be determined based on the fault tolerant quantity in the GF (Galois Field) $2^m$. For example, if m=14, the original message data of 1024 bytes requires parity data of 11 bytes for automatically checking and correcting data which has errors less than 6-bit errors. In another example, if the original message data also includes redundant data which are some redundant messages for error correction, the original message data of 1024 bytes plus the redundant data of 16 bytes require parity data of 11 bytes for automatically checking and correcting data which has errors less than 6-bit errors. In this case, the fault tolerant quantity of the error correction code is of 6 bits. In yet another example, the original message data of 1024 bytes may require parity data of 63 bytes if the fault tolerant quantity of the error correction code is of 36 bits, and the original message data of 1024 bytes may require parity data of 105 bytes if the fault tolerant quantity of the error correction code is of 60 bits. In one embodiment, the first and second parity data are both stored in the parity data storage unit 143 of the storage unit 140 when the encoded data is read from the memory unit 210.

For explanation, error correction code encoders and decoders are illustrated as examples in this embodiment, and those skilled in the art will understand that the present invention is not limited thereto. In the following embodiments, it is assumed that the error correction code is implemented as a BCH code, but the present invention is not limited thereto. For example, the error correction code may also be implemented as error correction code encoded by other encoding algorithms, such as a Hamming code, a Reed-Solomon code, a Reed-Muller code, a Binary Golay code, a convolutional code, a turbo code and so on.

Figure 5:
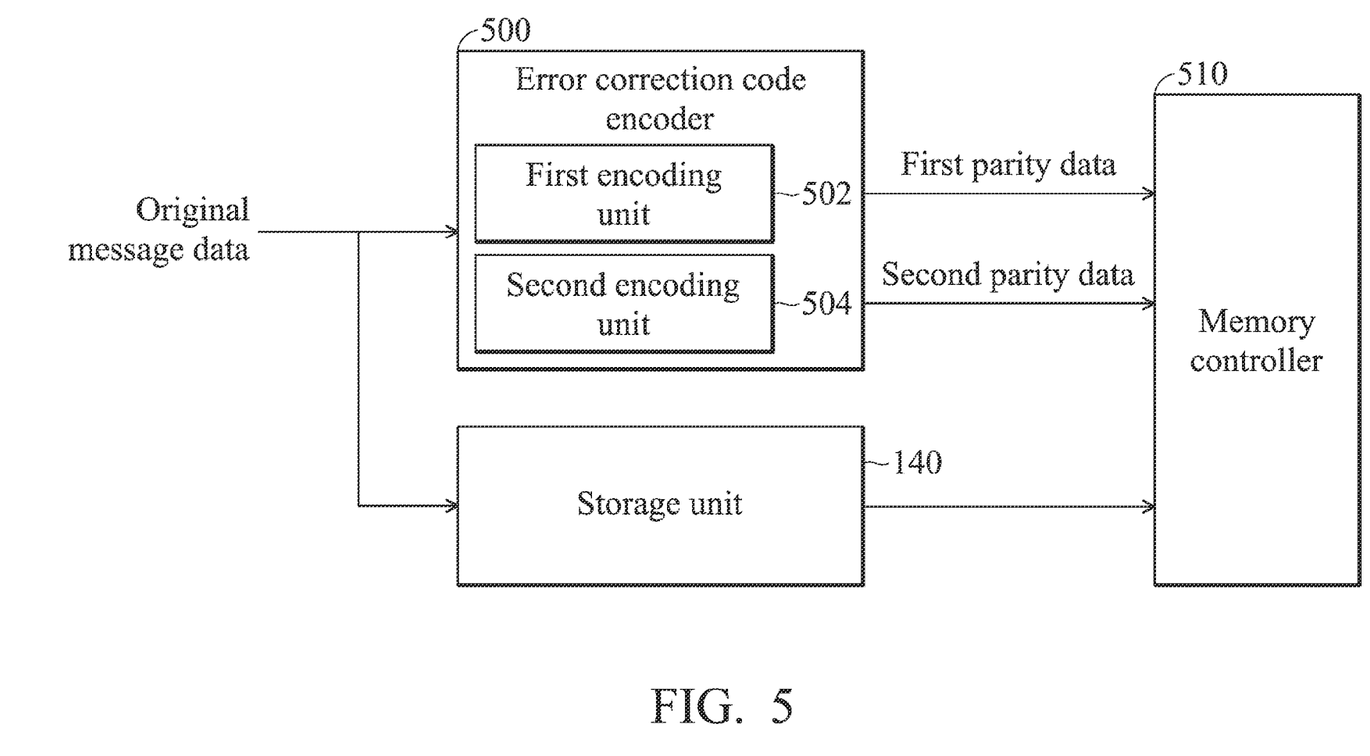
FIG. 5 is a block diagram illustrating an embodiment of an error correction code encoder of the invention.

FIG. 5 is a block diagram illustrating an embodiment of an error correction code encoder 500 of the invention. In this embodiment, the error correction code encoder 500 may further comprise a first encoding unit 502 and a second encoding unit 504, wherein the error correction code encoder 500, the first encoding unit 502 and the second encoding unit 504 correspond to the encoder 150, the first encoding unit 152 and the second encoding unit 154 of FIG. 1 respectively. As above-mentioned, the error correction code encoder 500 has to generate parity data corresponding to both the two levels at the same time during the data writing operation. As shown in FIG. 5, during the data writing operation, the DMA controller first obtains original message data from the DRAM (not shown). The obtained original message data is then stored in the storage unit which can be the storage unit 140 of FIG. 1 or other storage unit and further be transmitted to the first encoding unit 502 and the second encoding unit 504 to respectively calculate a first parity data corresponding to the error correction code with a fault tolerant quantity of 6 bits and a second parity data corresponding to the error correction code with a fault tolerant quantity of 36 bits. Thereafter, the calculated first and second parity data along with the original message data that is stored in the storage unit 140 are written to the specific memory unit through a memory controller 510 such as an Advanced Nand Flash Controller. In some embodiments, the error correction code encoder 500 may first generate an encoded data (e.g., 400 of FIG. 4) according to the data to be written and the first and second parity data, and then write the encoded data generated to responsive memory unit.

Figure 6:
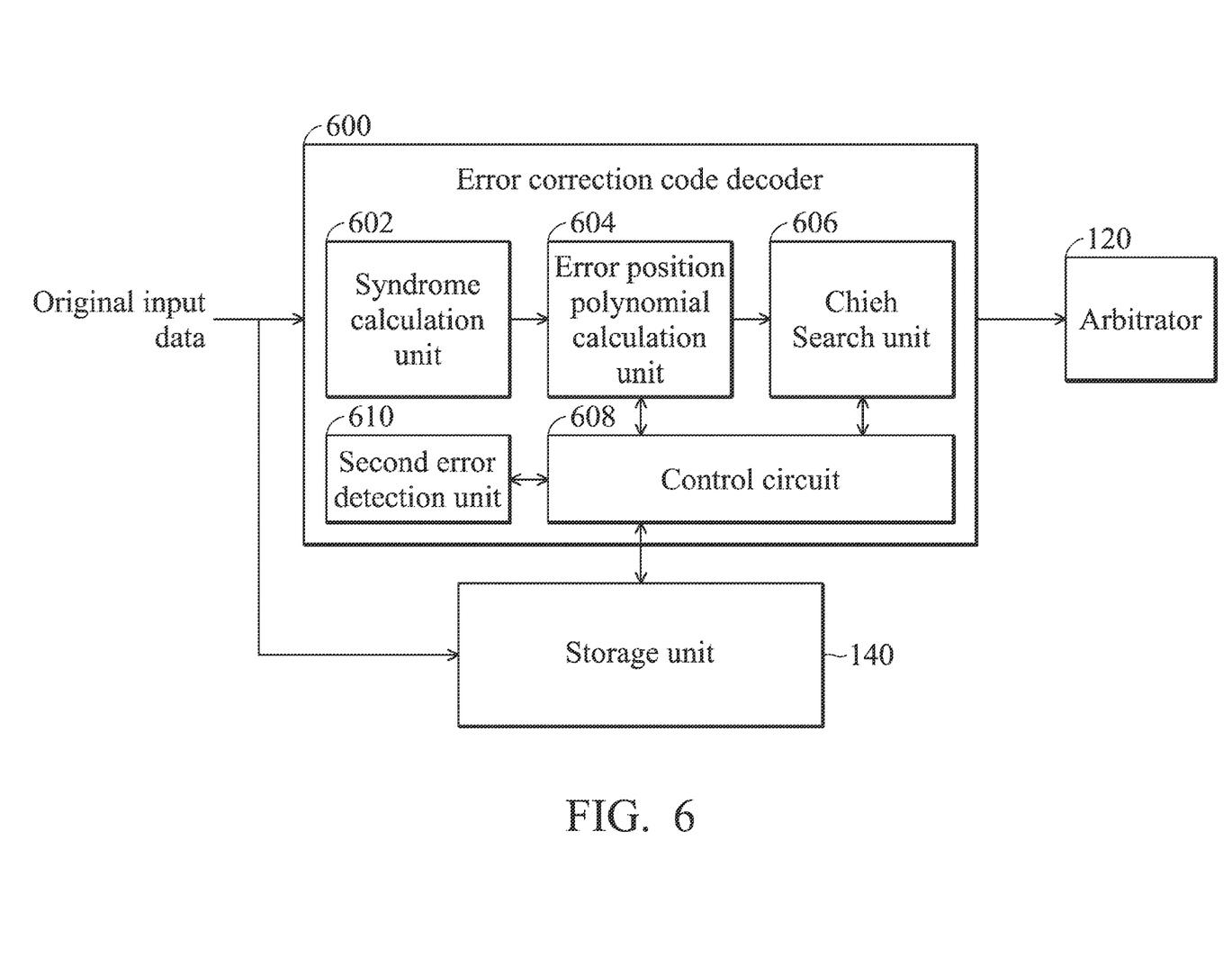
FIG. 6 is a block diagram illustrating an embodiment of an error correction code decoder of the invention.

FIG. 6 is a block diagram illustrating an embodiment of an error correction code decoder 600 of the invention. In this embodiment, the error correction code decoder 600 may further comprise a syndrome calculation unit 602 (SCBlock), an error position polynomial calculation unit 604 (KES), a Chien Search unit 606 (CSEE) and a control circuit 608 (Main Control), wherein the error correction code decoder 600 can be configured to the first decoder 160 or the second decoder 170 of FIG. 1. For example, if error correction code decoder 600 is configured to the first decoder 160 of FIG. 1, the syndrome calculation unit 602 corresponds to the first error detection unit 262 of FIG. 1 while the error position polynomial calculation unit 604, the Chien Search unit 606 and the control circuit 608 correspond to the first error correction unit 164.

In the data reading operation that obtains data from the memory unit, the obtained data is an encoded error correction code and thus the encoded error correction code must be decoded to restore to the original data therefrom before using the data. When receiving the error correction code (e.g. a BCH code), the error correction code decoder 600 obtains message data and parity data contained from the received error correction code. First, the syndrome calculation unit 602 calculates a plurality of syndrome values $S_1, S_2, \ldots, S_K$ according to the parity data of the error correction code. The syndrome calculation unit 602 determines whether or not all of the calculated syndrome values $S_1, S_2, \ldots, S_K$ are 0. When it is determined that all of the calculated syndrome values are 0, which means that there is no error occurring in the error correction code, no further error correction operation is required. Contrarily, When it is determined that any of the calculated syndrome values is not 0, which means that there is an error occurring in the error correction code, an error correction operation will be performed to correct the errors occurring in the error correction code. Therefore, the syndrome calculation unit 602 generates a detection result ECC_ERR which indicates that the error correction code has errors to the error position polynomial calculation unit 604 to perform an error correction operation. Then, the error position polynomial calculation unit 604 generates a number of coefficients for an error location polynomial according to the calculated syndrome values $S_1, S_2, \ldots, S_K$ and determines the number of roots for the error location polynomial. For example, the error position polynomial calculation unit 604 may determine the number of the roots for the error location polynomial by checking the power number of the highest power that the coefficients for the error location polynomial is set to be an non-zero value. The Chien Search unit 606 may perform a Chien Search to find all roots of the error location polynomial to ensure the bit position of errors occurring in the received data for error correction. Since the roots of the error location polynomial indicate the bit positions of errors occurring in the error correction code, the control circuit 608 of the error correction code decoder 600 may correct the error correction code based on the roots of the error location polynomial, such as correcting by revising the values of the bits having errors, to obtain a corrected data. The control circuit 608 will continually check whether all of the calculated syndrome values $S_1, S_2, \ldots, S_K$ are 0 and stop the calculation of coefficients for the error location polynomial by the error position polynomial calculation unit 604 and stop the search of the roots of the error location polynomial by the Chien Search unit 606 if all of the calculated syndrome values $S_1$, $S_2, \ldots, S_K$ are 0.

If the error correction code decoder 600 is the first decoder 160 of the first error correction module 110, aforementioned error correction operation may further be provided to determine whether the number of the roots of error location polynomial found by the Chien Search unit 606 is equal to that of the roots of error location polynomial calculated by the error position polynomial calculation unit 604 so as to determine whether the decoding is successful or not. If the number of the roots of error location polynomial found by the Chien Search unit 606 is equal to that of the roots of error location polynomial calculated by the error position polynomial calculation unit 604, the decoding is determined as successful. Contrarily, if the number of the roots of error location polynomial found by the Chien Search unit 606 is not equal to that of the roots of error location polynomial calculated by the error position polynomial calculation unit 604, which means that the decoding was not successful, a decoding result decode_fail which indicates that the first ECC operation of the first level was not successful is generated to the arbitrator 120. Upon reception of the decoding result decode_fail indicating that the first ECC operation of the first level was not successful, the arbitrator 120 activates the second error correction module 130 to perform the second ECC operation of the second level. In some practice implements, to increase the precision of error correction, the decoding may not be ensured to be successful even if the number of the roots of error location polynomial found by the Chien Search unit 606 is equal to that of the roots of error location polynomial calculated by the error position polynomial calculation unit 604, i.e. even if the decoding result decode_fail was not generated. In one embodiment, if the error correction code decoder 600 is the first decoder 160, it may further include a second error detection unit 610 which is coupled to the first error correction unit 164 (including the error position polynomial calculation unit 604, the Chien Search unit 606 and the control circuit 608 of FIG. 6) for performing a second error detection operation to the corrected data outputted by the first error correction unit 164 to generate the decoding result, wherein the decoding result indicates whether the corrected data output by the first error correction unit 164 has errors. If the corrected data has no error, which means that the decoding was successful, the control circuit 608 stores the corrected data to the storage unit 140 for reading by the host device host (not shown). If the corrected data has errors, which means that the decoding was not successful, the second error detection unit 610 sends the decoding result decode_fail which indicates that the first ECC operation of the first level was not successful to the arbitrator 120. In this embodiment, the second error detection unit 610 performs the error detection to the corrected data output by the first error correction unit 164 rather than the original input data. Moreover, the detection result for the second error detection unit 610 is transmitted as the decoding result to the arbitrator 120 rather than transmitting the signal decode_fail as the decoding result to the arbitrator 120.

In sum, the ECC system of a memory module of the invention provides a two-level error correction structure, wherein each level has a different data fault tolerance capability (e.g. level 1 error correction can correct at most 6 bits error occurring in 1K bytes, while level 2 error correction can correct 36/60 bits error occurring in 1K bytes), wherein each memory unit in a memory module has its own level 1 error correction of a smaller fault tolerance quantity, while multiple memory units share a level 2 error correction of a greater fault tolerance quantity. Thus, hardware cost can be effectively reduced while system performance requirements preserved. Moreover, the arbitration module of the present invention can selectively activate level 2 error correction in accordance with whether fault occurred in a level 1 error correction operation of each shared memory unit, wherein as the majority of occurrence probability falls in smaller bit errors, level 2 error correction can only be activated when the level 1 error correction operation was not successful, thus providing preferred error correction performance. Furthermore, the ECC system of a memory module of the invention can configure a register for selecting activate/deactivate of a level 2 error correction function, thereby enhancing the flexibility in application use.

Methods for error checking and correcting (ECC) in a memory module, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalent.

What is claimed is:

1. A method for error checking and correcting (ECC) in a memory module including a plurality of memory units respectively coupled to a plurality of first ECC modules, wherein each of the plurality of first ECC modules corresponds to one of the memory units and is used for receiving input data from the corresponding memory unit, the method comprising:

receiving, by each of the plurality of first ECC modules, input data from the corresponding memory unit;

performing, by each of the plurality of first ECC modules, a first ECC operation to the respective input data and respectively generating a decoding result which indicates whether a decoding process is successful; and activating a second ECC module to perform a second ECC operation when any of the decoding results of the first ECC modules indicates that the decoding was not successful, wherein the first and second ECC modules respectively utilize a first method and a second method and the first method applies an error correction code with a first fault tolerant quantity for error correction and the second method applies an error correction code with a second fault tolerant quantity for error correction, wherein the second fault tolerant quantity is larger than the first fault tolerant quantity.

2. The method of claim 1, further comprising:
performing, by an error detection unit, an error detection operation to the respective input data and generating a detection result for each of the first ECC modules, wherein the detection result of each of the first ECC modules indicates whether the respective input data has errors; and
when the detection result of one of the first ECC modules indicates that the respective input data has errors, performing the first ECC operation to the respective input data by the one of the first ECC modules.

3. The method of claim 1, further comprising:
determining not to activate the second ECC module for performing the second ECC operation when the decoding result of each first ECC module indicates that decoding was successful.

4. The method of claim 1, wherein the memory units further comprises a first memory unit and a second memory unit and when the decoding results of both the first and second memory units indicate that the decoding was not successful, the first and second memory units sequentially utilize the second ECC module to perform the second ECC operation using a polling method.

5. The method of claim 1, wherein the memory units further comprises a first memory unit and a second memory unit and each of the first and second memory units has a priority and the first and second memory units sequentially utilize the second ECC module to perform the second ECC operation according to the priorities of the first and second memory units.

6. The method of claim 1, further comprising:
receiving data to be written to one of the plurality of memory units;
generating first parity data corresponding the first method and second parity data corresponding to the second method according to the received data through a first encoding method and a second encoding method respectively;
generating an encoded data according to the received data, and the first and second parity data; and
writing the encoded data to the one of the memory units.

7. The method of claim 1, further comprising:
providing a register for configuring whether to allow activating the second ECC module for performing the second ECC operation.

8. The method of claim 1, wherein each memory unit is a flash memory chip.

9. An error checking and correcting (ECC) system of a memory module, wherein the memory module comprises a plurality of memory units, comprising:
a plurality of first ECC modules respectively coupled to the corresponding memory units, wherein each of the plurality of first ECC modules corresponds to one of the memory units and is used for receiving input data from the responsive memory unit and performing a first ECC operation to the input data to generate a decoding result;
a second ECC module, performing a second ECC operation when being activated, wherein each of the first ECC modules respectively utilize an error correction code with a first fault tolerant quantity for error correction, and the second ECC module utilize an error correction code with a second fault tolerant quantity for error correction, wherein the second fault tolerant quantity is larger than the first fault tolerant quantity; and
an arbitrator coupled between the plurality of first ECC modules and the second ECC module, wherein the arbitrator determines whether to activate the second ECC module according to the decoding results generated by the plurality of first ECC modules,
wherein the arbitrator further determines to activate the second ECC module to perform the second ECC operation to the input data when any of the decoding results indicates that the decoding was not successful.

10. The ECC system of claim 9, wherein each of the plurality of first ECC modules further comprises:
a first error detection unit, performing a first error detection operation to the input data and generating a first detection result during a data reading operation, wherein the first detection result indicates whether the input data has errors; and
a first error correction unit coupled to the first error detection unit, performing the first ECC operation to the input data to generate the decoding result to the arbitrator when the detection result indicates that the input data has errors.

11. The ECC system of claim 9, wherein each of the plurality of first ECC module further comprises:
a first error detection unit, performing a first error detection operation to the input data and generating a first detection result during a data reading operation, wherein the first detection result indicates whether the input data has errors;
a first error correction unit coupled to the first error detection unit, performing the first ECC operation to the input data to generate a corrected data when the detection result indicates that the input data has errors; and
a second error detection unit coupled to the first error correction unit, performing a second error detection operation to the corrected data to generate the decoding result to the arbitrator.

12. The ECC system of claim 9, wherein each of the plurality of first ECC modules further comprises:
an encoder having first and second encoding units, receiving data to be written to one of the plurality of memory units during a data writing operation, wherein the first and second encoding units respectively generate first parity data corresponding to the error correction code with the first fault tolerant quantity and second parity data corresponding to the error correction code with the second fault tolerant quantity according to the received data, and the encoder generates an encoded data according to the received data, and the first and second parity data and writes the encoded data to the one of the memory units.

13. The ECC system of claim 9, wherein the second ECC module further comprises:
a second error correction unit for performing the second ECC operation to the input data when any of the decoding results indicates that the decoding was not successful.

14. The ECC system of claim 13, wherein the second ECC module further comprises:
a second error detection unit coupled to the second error correction unit, performing a second error detection operation to the input data and generating a second detection result during a data reading operation, wherein the second detection result indicates whether the input data has errors.

15. The ECC system of claim 9, wherein the memory units at least comprise a first memory unit and a second memory unit and the arbitrator further performs the second ECC operation to the first and second memory units sequentially by polling when the decoding results of both the first and second memory units indicate that the decoding was not successful.

16. The ECC system of claim 15, wherein each of the first and second memory units has a priority and the arbitrator further performs the second ECC operation to the first and second memory units sequentially according to the priorities of the first and second memory units.

17. The ECC system of claim 9, further comprising a register for configuring whether to allow activating the second ECC module for performing the second ECC operation.

18. The ECC system of claim 9, wherein each of the memory units is a flash memory chip and the memory module is formed by a plurality of flash memory chips.

* * * * *